(12) United States Patent
Schwartz et al.

(10) Patent No.: US 11,263,488 B2
(45) Date of Patent: Mar. 1, 2022

(54) SYSTEM AND METHOD FOR AUGMENTING FEW-SHOT OBJECT CLASSIFICATION WITH SEMANTIC INFORMATION FROM MULTIPLE SOURCES

(71) Applicant: International Business Machines Corporation, Armonk, NY (US)

(72) Inventors: Eliyahu Schwartz, Haifa (IL); Leonid Karlinsky, Mazkeret Batya (IL); Rogerio Schmidt Feris, Hartford, CT (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 16/846,480

(22) Filed: Apr. 13, 2020

(65) Prior Publication Data

US 2021/0319263 A1 Oct. 14, 2021

(51) Int. Cl.
*G06K 9/62* (2006.01)
*G06N 3/04* (2006.01)
*G06N 3/08* (2006.01)

(52) U.S. Cl.
CPC .......... *G06K 9/6257* (2013.01); *G06K 9/628* (2013.01); *G06N 3/04* (2013.01); *G06N 3/08* (2013.01)

(58) Field of Classification Search
CPC ........ G06K 9/6257; G06K 9/628; G06N 3/08; G06N 3/04
USPC ....................................................... 382/157
See application file for complete search history.

(56) References Cited

U.S. PATENT DOCUMENTS

| 10,331,976 B2 | 6/2019 | Akata | |
|---|---|---|---|
| 2017/0329769 A1* | 11/2017 | Berg | G06F 16/7867 |
| 2019/0294881 A1* | 9/2019 | Polak | G06K 9/4628 |
| 2020/0320769 A1* | 10/2020 | Chen | G06K 9/6267 |

OTHER PUBLICATIONS

Xu, "bedding space for zero-shot action recognition" 2015 IEEE International Conference on Image Processing (ICIP) Year: 2015 | Conference Paper | Publisher: IEEE (Year: 2015).*

(Continued)

*Primary Examiner* — Juan A Torres
(74) *Attorney, Agent, or Firm* — G. E. Ehrlich

(57) ABSTRACT

Embodiments may provide learning and recognition of classifications using only one or a few examples of items. For example, in an embodiment, a method of computer vision processing may be implemented in a computer comprising a processor, memory accessible by the processor, and computer program instructions stored in the memory and executable by the processor, the method may comprise training a neural network system implemented in the computer system to classify images into a plurality of classes using one or a few training images for each class and a plurality of associated semantic information, wherein the plurality of associated semantic information is from a plurality of sources and comprises at least some of class/object labels, textual description, or attributes, and wherein the neural network is trained by modulating the training images by sequentially applying the plurality of associated semantic information and classifying query images using the trained neural network system.

20 Claims, 4 Drawing Sheets

(56) References Cited

OTHER PUBLICATIONS

Jain, "Objects2action: Classifying and Localizing Actions without Any Video Example" 2015 IEEE International Conference on Computer Vision (ICCV) Year: 2015 | Conference Paper | Publisher: IEEE (Year: 2015).*

Duo Wang et al., A Hybrid Approach with Optimization and Metric-based Meta-Learner for Few-Shot Learning, arXiv:1904.03014v2 [cs.LG] Aug. 27, 2019.

Adam Santoro, Sergey Bartunov, Matthew Botvinick, Daan Wierstra, and Timothy Lillicrap. Meta-Learning with Memory-Augmented Neural Networks. Journal of Machine Learning Research, 48(Proceedings of the 33rd International Conference on Machine Learning): 1842-1850, 2016.

Alec Radford, Luke Metz, and Soumith Chintala. Unsupervised Representation Learning with Deep Convolutional Generative Adversarial Networks. arXiv:1511.06434, pp. 1-16, 2015.

Alexey Dosovitskiy, Jost Tobias Springenberg, Maxim Tatarchenko, and Thomas Brox. Learning to Generate Chairs, Tables and Cars with Convolutional Networks. IEEE Transactions on Pattern Analysis and Machine Intelligence, 39 (4):692-705, 2017.

Andrei A. Rusu, Dushyant Rao, Jakub Sygnowski, Oriol Vinyals, Razvan Pascanu, Simon Osindero, and Raia Hadsell. Meta-Learning with Latent Embedding Optimization. In ICLR, 7 2018.

Antreas Antoniou, Amos Storkey, and Harrison Edwards. Data Augmentation Generative Adversarial Networks. arXiv:1711.04340, 2017.

Aron Yu and Kristen Grauman. Semantic Jitter: Dense Supervision for Visual Comparisons via Synthetic Images. Proceedings of the IEEE International Conference on Computer Vision, Oct. 2017:5571-5580, 2017.

Bharath Hariharan and Ross Girshick. Low-shot Visual Recognition by Shrinking and Hallucinating Features. IEEE International Conference on Computer Vision (ICCV), 2017.

Boris N. Oreshkin, Pau Rodriguez, and Alexandre Lacoste. TADAM: Task dependent adaptive metric for improved few-shot learning. NeurIPS, 5 2018.

Carina Silberer, Vittorio Ferrari, and Mirella Lapata. Visually grounded meaning representations. IEEE transactions on pattern analysis and machine intelligence, 39(11):2284-2297, 2016.

Chelsea Finn, Pieter Abbeel, and Sergey Levine. Model-Agnostic Meta-Learning for Fast Adaptation of Deep Networks. arXiv:1703.03400, 2017.

Dennis Park and Deva Ramanan. Articulated pose estimation with tiny synthetic videos. IEEE Conference on Computer Vision and Pattern Recognition (CVPR), Oct. 2015:58-66, 2015.

Eli Schwartz, Leonid Karlinsky, Joseph Shtok, Sivan Harary, Mattias Marder, Abhishek Kumar, Rogerio Feris, Raja Giryes, and Alex M Bronstein. Delta-Encoder: an Effective Sample Synthesis Method for Few-Shot Object Recognition. NIPS, 2018.

Eli Shechtman Jun-Yan Zhu, Philipp Krahenbuhl and Alexei Efros. Generative Visual Manipulation on the Natural Image Manifold. European Conference on Computer Vision (ECCV)., pp. 597-613, 2016.

Fengwei Zhou, Bin Wu, and Zhenguo Li. Deep Meta-Learning: Learning to Learn in the Concept Space. arXiv:1802.03596, 2 2018.

Chongyu Pan et al., Few-Shot Transfer Learning for Text Classification with Lightweight Word Embedding Based Models, IEEE Access, vol. 7, pp. 53296-53304, Apr. 18, 2019.

G Flood Sung, Yongxin Yang, Li Zhang, Tao Xiang, Philip H S Torr, and Timothy M Hospedales. Learning to Compare Relation Network for Few-Shot Learning, Mar. 27, 2018.

Hao Su, Charles R Qi, Yangyan Li, and Leonidas J Guibas. Render for CNN Viewpoint Estimation in Images Using CNNs Trained with Rendered 3D Model Views.pdf. IEEE International Conference on Computer Vision (ICCV), pp. 2686-2694, 2015.

Hugo Larochelle, Dumitru Erhan, and Yoshua Bengio. Zero-data learning of new tasks. In AAAI, vol. 1, p. 3, 2008.

Ian Goodfellow, Jean Pouget-Abadie, Mehdi Mirza, Bing Xu, David Warde-Farley, Sherjil Ozair, Aaron Courville, and Yoshua Bengio. Generative Adversarial Nets. Advances in Neural Information Processing Systems 27, pp. 2672-2680, 2014.

Ishan Durugkar, Ian Gemp, and Sridhar Mahadevan. Generative Multi-Adversarial Networks. International Conference on Learning Representations (ICLR), pp. 1-14, 2017.

Jacob Devlin, Ming-Wei Chang, Kenton Lee, Kristina Toutanova Google, BERT: Pre-training of Deep Bidirectional Transformers for Language Understanding, arXiv:1810.04805v2 [cs.CL] May 24, 2019.

Joseph J Lim, Ruslan Salakhutdinov, and Antonio Torralba. Transfer Learning by Borrowing Examples for Multiclass Object Detection. Advances in Neural Information Processing Systems 26 (NIPS), pp. 1-9, 2012.

Jun Yan Zhu, Taesung Park, Phillip Isola, and Alexei A. Efros. Unpaired Image-to-Image Translation Using Cycle-Consistent Adversarial Networks. Proceedings of the IEEE International Conference on Computer Vision, Oct. 2017:2242-2251, 2017.

Kaiming He, Xiangyu Zhang, Shaoqing Ren, and Jian Sun. Deep Residual Learning for Image Recognition. arXiv:1512.03385, 2015.

Kelvin Guu, Tatsunori B Hashimoto, Yonatan Oren, and Percy Liang. Generating Sentences by Editing Prototypes. Arxiv:1709.08878, 2017.

Kilian Q Weinberger and Lawrence K Saul. Distance Metric Learning for Large Margin Nearest Neighbor Classification. The Journal of Machine Learning Research, 10:207-244, 2009.

Linda B Smith. Learning to Recognize Objects. Psychological Science, 14(3):244-250, 2003.

Mark Palatucci, Dean Pomerleau, Geoffrey E Hinton, and Tom M Mitchell. Zero-shot learning with semantic output codes. In Advances in neural information processing systems, pp. 1410-1418, 2009.

Olga Russakovsky, Jia Deng, Hao Su, Jonathan Krause, Sanjeev Satheesh, Sean Ma, Zhiheng Huang, Andrej Karpathy, Aditya Khosla, Michael Bernstein, Alexander C. Berg, and Li Fei-Fei. ImageNet LargeScale Visual Recognition Challenge. IJCV, 9 2015.

Oren Rippel, Manohar Paluri, Piotr Dollar, and Lubomir Bourdev. Metric Learning with Adaptive Density Discrimination. arXiv:1511.05939, pp. 1-15, 2015.

Oriol Vinyals, Charles Blundell, Timothy Lillicrap, Koray Kavukcuoglu, and Daan Wierstra. Matching Networks for One Shot Learning. NIPS, 2016.

Sachin Ravi and Hugo Larochelle. Optimization as a Model for Few-Shot Learning. ICLR, pp. 1-11, 2017.

* cited by examiner

SYSTEM AND METHOD FOR AUGMENTING FEW-SHOT OBJECT CLASSIFICATION WITH SEMANTIC INFORMATION FROM MULTIPLE SOURCES

BACKGROUND

The present invention relates to techniques that provide learning and recognition of classifications or categories using only one or a few examples of items in that classification.

Modern day computer vision has experienced a tremendous leap due to the advent of deep learning (DL) techniques. The DL-based approaches reach higher levels of performance even compared to humans in tasks requiring expertise, such as recognizing dog breeds, or faces of thousands of celebrities. Yet, despite all the advances, some innate human abilities, available to us at a very young age, still elude modern AI systems. One of these is the ability to learn and later successfully recognize new, previously unseen, visual categories when presented to us with one or very few examples. This 'few-shot learning' task has been thoroughly explored in the computer vision literature and numerous approaches have been proposed. Yet so far, the performance of even the best few-shot learning methods fall short by a significant margin from the performance of the fully supervised learning methods trained with a large number of examples.

Accordingly, a need arises for techniques that provide learning and recognition of classifications using only one or a few examples of items in that classification.

SUMMARY

Embodiments may provide techniques that provide learning and recognition of classifications or categories using only one or a few examples of items in that classification.

For example, in an embodiment, a method of computer vision processing may be implemented in a computer comprising a processor, memory accessible by the processor, and computer program instructions stored in the memory and executable by the processor, the method may comprise training a neural network system implemented in the computer system to classify images into a plurality of classes using one or a few training images for each class and a plurality of associated semantic information, wherein the plurality of associated semantic information is from a plurality of sources and comprises at least some of class/object labels, textual description, or attributes, and wherein the neural network is trained by modulating the training images by sequentially applying the plurality of associated semantic information and classifying query images using the trained neural network system.

In embodiments, the modulating may be unconstrained. The neural network system may comprise at least one branch for processing images and a plurality of branches for processing semantic information, each branch corresponding to a class, and updating machine learning models based on the image or semantic information processed by that branch. Each branch may generate prototype feature vectors of the class to which each branch corresponds, based on the image or semantic information processed by that branch. The prototype feature vectors from each branch may be combined using a convex combination to generate predictions based on data input to all branches. The convex combination may be weighted using a semantic attention coefficient computed based on at least one of the prototype feature vectors. The associated semantic information may comprise labels, descriptions, and attributes related to the images.

In an embodiment, a system for computer vision processing may comprise a processor, memory accessible by the processor, and computer program instructions stored in the memory and executable by the processor to perform training a neural network system implemented in the computer system to classify images into a plurality of classes using one or a few training images for each class and a plurality of associated semantic information, wherein the plurality of associated semantic information is from a plurality of sources and comprises at least some of class/object labels, textual description, or attributes, and wherein the neural network is trained by modulating the training images by sequentially applying the plurality of associated semantic information and classifying query images using the trained neural network system.

In an embodiment, a computer program product for computer vision processing may comprise a non-transitory computer readable storage having program instructions embodied therewith, the program instructions executable by a computer, to cause the computer to perform a method comprising training a neural network system implemented in the computer system to classify images into a plurality of classes using one or a few training images for each class and a plurality of associated semantic information, wherein the plurality of associated semantic information is from a plurality of sources and comprises at least some of class/object labels, textual description, or attributes, and wherein the neural network is trained by modulating the training images by sequentially applying the plurality of associated semantic information and classifying query images using the trained neural network system.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may provide techniques that provide learning and recognition of classifications or categories using only one or a few examples of items in that classification.

One important ingredient of human infant learning is the associated semantics that comes with the provided example. For example, it has been shown in the child development literature that infants' object recognition ability is linked to their language skills and it is hypothesized that it might be related to the ability to describe objects. Indeed, when a parent points a finger at a new category to be learned (for example, "look, here is a puppy"), it is commonly accompanied by additional semantic references or descriptions for that category (for example, "look at his nice fluffy ears", "look at his nice silky fur", "the puppy goes woof-woof", etc.). This additional, and seldom rich, semantic information can be very useful to the learner. Indeed, language, as well as vision domains, both describe the same physical world in different ways, and in many cases contain useful complementary information that can be carried over to the learner in the other domain (visual to language and vice versa).

Embodiments of the present systems and methods may provide a more realistic human-like learning setting. This is done by providing a machine learning system access to both richer 'description level' semantic information, such as a sentence, or a few sentences, in a natural language with a description of the category, instead of just a label, as well as multiple semantics—a set of several references or descriptions that are all related to the category being learned, such as both category label and category description used jointly. These richer descriptions and the multiple semantic setting may facilitate few-shot learning (leveraging the intuition of how human infants learn). Typically, more complex semantics (description) alone is not sufficient for improving performance. However, embodiments that combine more complex semantics with the label semantics in a multiple semantic setting, may provide improved performance.

Accordingly, embodiments may utilize a new, perhaps closer to 'infant learning' setting of Few-Shot Learning with Multiple and Complex Semantics (FSL-MCS), a new benchmark for FSL-MCS, and an associated training and evaluation protocol, and a new multi-branch network architecture for the proposed FSL-MCS setting benchmark.

Figure 1:
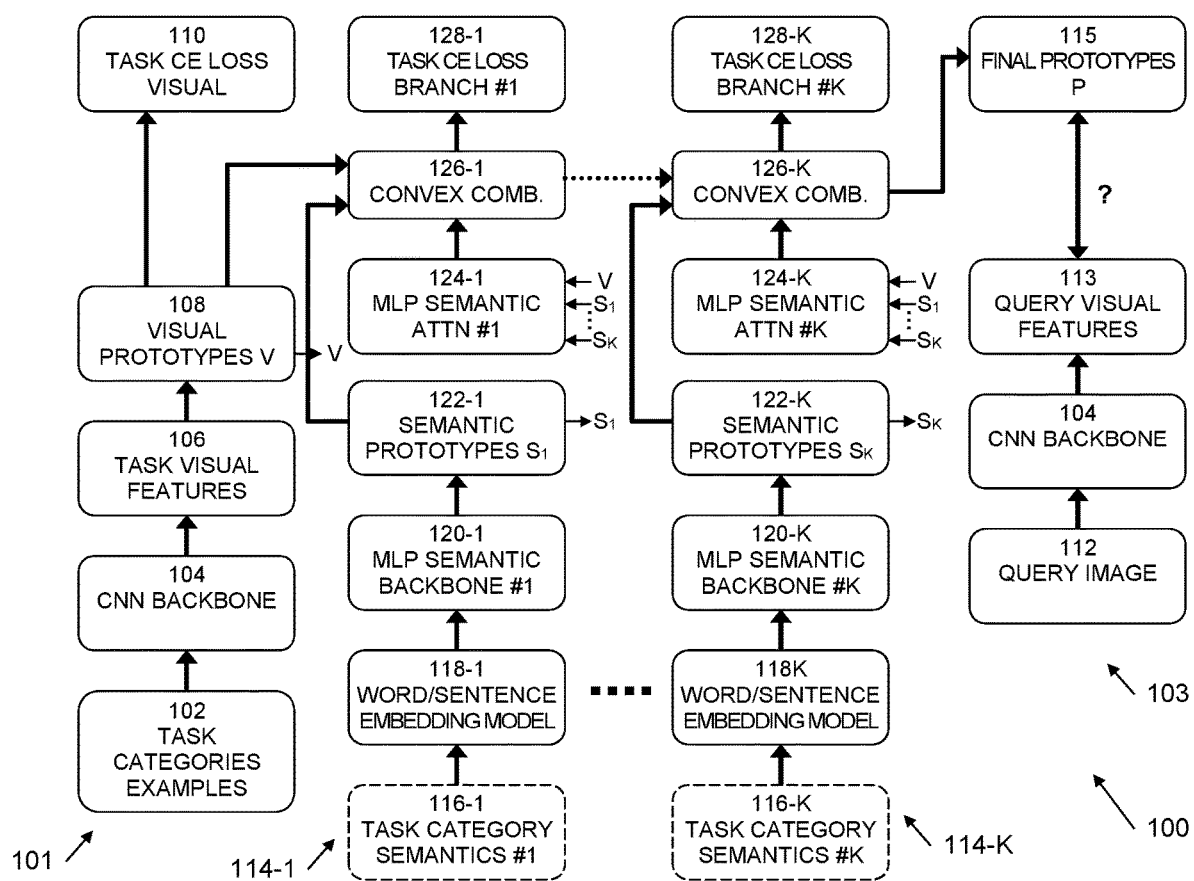
FIG. 1 is an exemplary model architecture according to embodiments of the present techniques.
Figure 3:
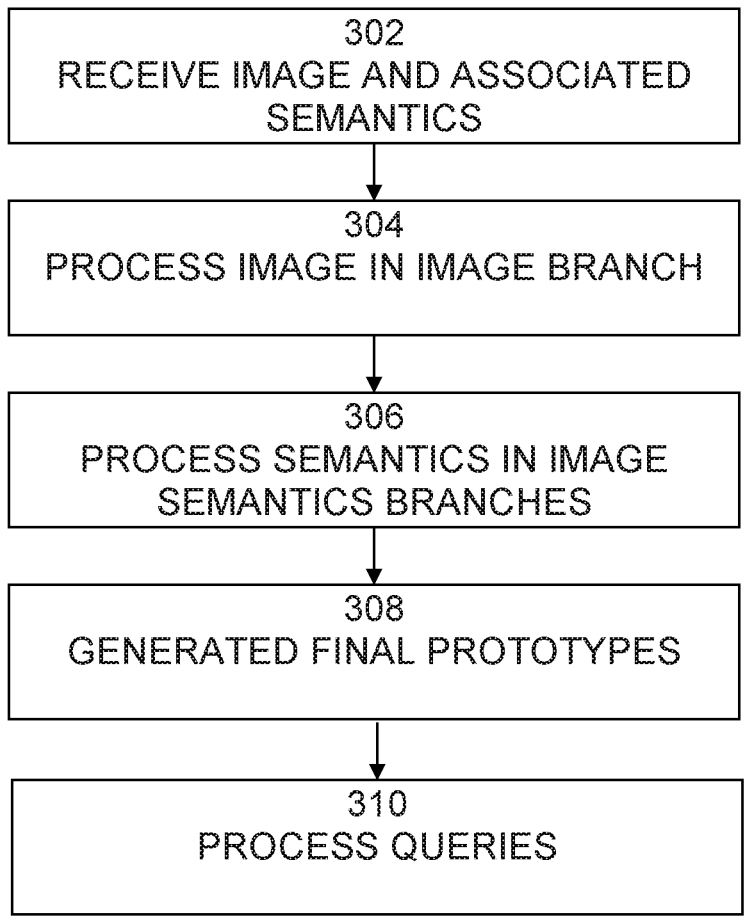
FIG. 3 is an exemplary flow diagram of a process of operation of the exemplary model architecture according to embodiments of the present techniques.

An exemplary model architecture 100 utilizing the present techniques is shown in FIG. 1. It is best viewed in conjunction with FIG. 3, which illustrates a process 300 of operation of model 100. Process 300 may begin with 302, in which model 100 may be trained using not only image information, but also using associated semantic information, such as labels, descriptions, audio information, etc. Model 100 may be trained using an episode-based meta-learning approach. The training may be performed on few-shot tasks (episodes) including one or a few image examples for each of the task categories 102 (the so-called support set), as well as one or several query images belonging to these categories (the so-called query set). Each task may simulate a few-shot learning problem. In addition, a multiple semantics approach, each task may be accompanied by semantic information, such as label and description sentence(s) on each of the task categories. For the labels, for example, GloVe embedding may be used, and for descriptions, for example, BERT embedding may be used, as GloVe may perform better for words and BERT for sentences.

At 304, the image may be processed by model 100 using an included visual information branch 101 supported by a CNN backbone 104 that may compute features both for the training images of the few-shot task and for the query images 112. For example, during training, example images of task categories 102 may be process by CNN backbone 104 to form task feature vectors 106 for each set of the task category support examples. Feature vectors 106 may be averaged to form a visual prototype feature vector V 108 for each category. A loss 110 may be computed.

A similar process may be performed both for training model 100 and for testing/using model 100. For example, a query image may be processed in a query branch 103. Query images 112 may be processed by CNN backbone 104 to generate feature vectors 113, which may be compared to existing feature vectors and a loss or distance computed to generate a prediction. According to the distance, a probability that each vector belongs to each class may be computed to form a distribution and a loss may be computed.

At 306, the associated semantic information may be processed by model 100 using one or more "semantic branches" 114-1 to 114-K for learning to incorporate the additional semantic information. As shown in FIG. 1, the output from each semantic branch 114-1 to 114-K may be combined to improve the results. Each semantic branch, such as semantic branch 114-1, may receive one or more words and/or sentences, such as 116-1, describing the category or classification. Pre-trained word or sentence embedding feature extractor models 118-1 to 118-K may extract features from the input 116-1 to 116-K to generate embedding vectors. Embedding models 118-1 to 118-K may be predefined/pretrained models that extract features and generate embedding vectors, while incorporating the semantics of natural language. For example, when the semantics of sentences are close, the sentences are close in meaning, etc. Each semantic branch 114-1 to 114-K may correspond to a category or classification and may generate an embedding vector corresponding to that category.

Multi-Layer Perceptron (MLP) 120-1, which may be trained, may use the embedding vectors to generate "semantic prototypes" $S_1$ 122-1 to be combined with the corresponding (same category) visual prototype 108. Each MLP 120-1 to 120-K learns its mapping and maps the embedding vectors to a space similar to that to which the visual prototypes V 108 are mapped to form semantic prototypes $S_1$ 122-1 to $S_K$ 122-K.

Figure 2:
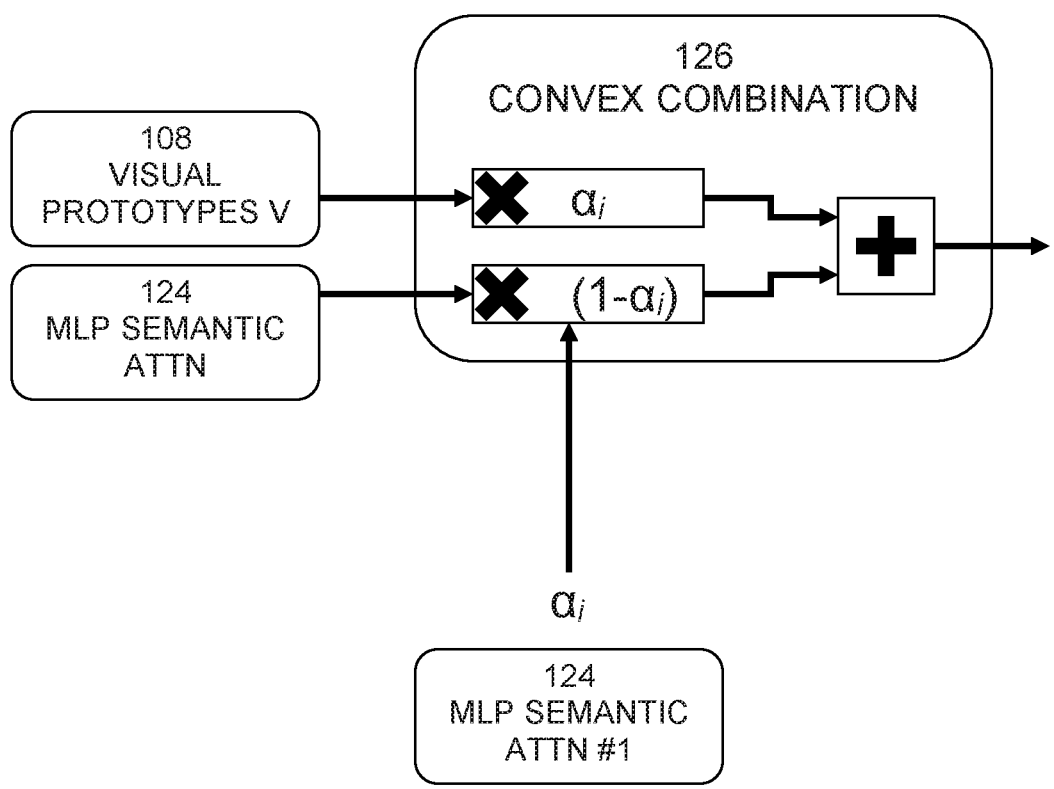
FIG. 2 is an exemplary block diagram of a convex combination according to embodiments of the present techniques.

For each branch, 114-1 to 114-K, a convex combination 126-1 to 126-K of visual prototypes 108 and the semantic prototypes 122-1 to 122-K may be computed. For example, turning to FIG. 2, a branch i may perform a convex combination 126 using visual prototypes V 108 and semantic prototypes 122-1 to 122-K using a coefficient $\alpha_i$. For the sake of this combination, each semantic branch may be equipped with an MLP 124-1 to 124-K calculating "semantic attention"—for example, a coefficient $\alpha_i$ of the semantic prototype of the branch in the overall convex combination 126-1 of the category prototypes. For computing $\alpha_i$, the attention MLP 124 for each branch may choose to receive as an input one or more of the task category prototypes, V 108 and $S_1$ 122-1 to $S_K$ 122-K, generated by either the visual or the semantic branches. Coefficient $\alpha_i$ then may be used to control the convex combination 126. As shown in FIG. 2, the visual prototypes V 108 may be multiplied by the coefficient $\alpha_i$, the semantic prototypes 122-1 to 122-K may be multiplied by 1-$\alpha_i$, and then the results may be combined. The effect of different inputs to the attention MLP of different semantic branches in the ablation study are described below.

Optionally, model 100 also allows for adding into the convex combination 126 additional branches 114-1 to 114-K with visual prototypes V 108 attended by either of the $S_i$ or V itself. Embodiments may include any number of such branches and convex combinations, which may include as inputs the results of any and all preceding branches. Finally, model 100 may feature a task specific cross-entropy loss on the prototype resulting from each (semantic 128-1 to 128-K or visual 110) branch, which allows for providing intermediate level supervision for each branch output using the ground truth labels associated to the few-shot tasks (episodes) used for meta-training. These losses admit the softmax normalized logits computed as negative distances between the task query samples and the prototypes produced by each respective semantic (or visual) branch.

At 308, the output of the convex combination 126-K of the final branch 114-K may be a final set of prototypes 115.

At 310, the final prototypes may then be compared to the query features 113, which may be generated by CNN backbone 104 from query images 112, and further may be normalized for the comparison.

To summarize, for each task category, each semantic branch may be uniquely determined by its two inputs—the semantic information being processed into the semantic prototype $S_i$ (category label, or one of the category descriptions), and the prototype (visual or semantic) being processed into the semantic attention coefficient $\alpha_i$. The final prototype P for a category in a given few shot task with an associated visual prototype V and semantic prototypes $\{S_i, \ldots, S_k\}$ may be computed as:

$$P = V \cdot \prod_{i=1}^{k} \alpha_i + \sum_{i=1}^{k}\left[ S_i \cdot (1-\alpha_i) \cdot \prod_{j=i+1}^{k} \alpha_j \right] \quad (1)$$

An intuitive visualization of eq. 1 is shown in FIG. 1. The final category prototype P is then compared to the query visual feature vector Q (produced by the CNN backbone) for computing the category probability as $prob(Q; P)=SM(-\|P-Q\|^2)$, where SM stands for the softmax normalization operator.

Assuming the correct category for the query Q has visual prototype V and semantic prototypes $\{S_i, \ldots, S_k\}$, then the final training loss incorporating the CE losses for all the visual and semantic branches may be written as:

$$\text{Loss} = -\log(prob(Q, V)) + \sum_{r=1}^{k} -\log(prob(Q, P_r)) \quad (2)$$

where $P_r$ is the output of the partial computation of equation 1 up until the semantic branch #r:

$$P_r = V \cdot \prod_{i=1}^{r} \alpha_i + \sum_{i=1}^{r}\left[ S_i \cdot (1-\alpha_i) \cdot \prod_{j=i+1}^{r} \alpha_j \right] \quad (3)$$

Embodiments may be implemented using systems including, for example, K40 NVidia GPUs. In embodiments, for example, the ResNet-12 backbone CNN with 512-features (flattened output) for each image may be used. In embodiments for example, for each semantic branch, the semantic backbone may be a two-layer MLP with a 300-sized hidden layer, and 512-sized output layer. The semantic attention for each branch may be a two-layer MLP with a 300-sized hidden layer and a scalar output layer followed by a sigmoid (to normalize the coefficients into a [0, 1] range). MLPs may include a dropout layer with, for example, a 0.7 rate between the hidden layer and the output layer.

In embodiments, the CNN backbone and all the semantic MLPs (backbones and attention) for the different branches may be trained jointly using the per branch Cross Entropy losses (applied to the predicted logits after a softmax for each branch). Embodiments may use, for example, 5 random few-shot episodes in each training mini-batch. The training may be performed using only the training subset of the categories of the few-shot dataset. Parameters may be randomly initialized (random normal initialization for the weights and a constant zero for the biases). The category descriptions that are used for the more complex semantic branches may be obtained automatically from, for example, WordNet, Table 1 shows some description examples.

TABLE 1

Some examples of descriptions for the miniImageNet categories extracted from WordNet.

| Label | Description |
|---|---|
| Sorrel | "A horse of a brownish orange to light brown color" |
| Consommé | "Clear soup usually of beef or veal or chicken" |
| Bookshop | "A shop where books are sold" |

The miniImageNet is a subset of the ImageNet dataset. It contains 100 randomly sampled categories, each with 600 images of size 84×84. The standard evaluation protocol was used to evaluate the 1-shot and the 5-shot performance of embodiments of the present techniques in a 5-way scenario (that is having 1 or 5 training examples for each of the 5 categories in the support set), using 64 categories for training, 16 for validation, and 20 for test. For testing, 1000 random test episodes were used, sampled from the test categories unseen during training. The same set of test episodes was used for all the experiments and repetitions. For each of the models evaluated, each experiment was repeated 5 times, each time with a different random initialization of the network parameters, following which the obtained 5 accuracy measures (evaluated on the 1000 test episodes for each of the resulting 5 models) were averaged and confidence interval was computed. The description semantics for the miniImageNet categories were collected from e WordNet definitions associated with the category labels.

TABLE 2

Results on miniImageNet benchmark. For 1-shot, adding more semantics improves over a single semantics (AM3) by 2.2%. For 5-shot, as observed in previous works, since the visual information is more reliable, semantic information is not very helpful. For context human performance is also reported. The adult performance is very high mainly due to prior familiarity with the categories in question.

| Method | 1-shot accuracy | 5-shot accuracy |
|---|---|---|
| Human performance | 70.0% | — |
| 4.5 years old | 99.0% | — |
| No semantics | | |
| DEML + Meta-SGD | 58.5 ± 0.9 | 71.3 ± 0.7 |
| CAML | 59.2 ± 1.0 | 72.4 ± 0.7 |
| Δ-encoder | 59.9 ± 1.0 | 69.7 ± 0.8 |
| LEO | 61.8 ± 0.1 | 77.6 ± 0.1 |
| With semantics | | |
| TriNet | 58.1 ± 1.4 | 76.9 ± 0.7 |
| AM3 ProtoNets | 65.0 ± 0.4 | 74.5 ± 0.2 |
| Multiple semantics (ours) | 67.2 ± 0.4 | 74.8 ± 0.3 |

Table 2 summarizes the results of embodiments applied to miniImageNet and compares to the state-of-the-art results with and without using semantics. For brevity, only the highest results from the literature are reported in each category. As can be seen, in the most challenging 1-shot scenario, embodiments of the multiple semantics based model improves the best previously reported result by 2.2%. The highest result is achieved using both multiple semantic branches, and more complex (than category labels) description based semantics. TriNet uses a deeper ResNet-18 feature extractor backbone than the ResNet-12 used herein. The branches used to achieve the best result and the examination of the different branch configurations alternatives are described below.

As expected, the most significant gain from using multiple additional semantics comes when the fewest amount of training examples is available, that is in the 1-shot case. For the 5-shot scenario, when more image examples become available for the novel categories, the importance of semantic information diminishes, and better results may be obtained by using deeper backbones (as in TriNet, for example) and advanced gradient based meta learning (LEO). Yet, even in this case, multiple semantics provide a small 0.3% improvement over using just the labels semantics (AM3-ProtoNet).

The AM3 provided implementation used a less-standard protocol for repeated evaluations. Instead of fixing the set of test episodes and training several times with random initialization of parameters for later averaging the results, in the AM3 original implementation the model was trained only once and the test set was randomized 5 times and not kept fixed between different tests. Therefore, in the spirit of the 'Reproducibility Checklist' adopted by the NeurIPS community, the AM3 results are reported arising from re-running the AM3 original implementation code following exactly the same parameters setting as defined by the authors, while adhering to the more standard protocol of repeated evaluation. The original reported results for miniImageNet evaluation of using the less-standard protocol were 65.2 and 75.2 for the 1 and 5 shot evaluations respectively.

Ablation study—table 3 summarizes the performance of different (multiple) semantic branch configuration alternatives and other aspects of the proposed approach evaluated using the 1-shot miniImageNet test.

As can be seen from the table, using the more complex description semantics instead of labels does not by itself improve the performance (table 3b). Also, using multiple semantic branches relying only on the labels, without adding additional semantic information (descriptions), to test the effect of this so-called 'semantic ensemble' on its own, leads to only slight 0:3% improvement over the baseline (table 3c), More significant improvement of 0:8% over the baseline is attained by 7 incorporating additional semantic information (descriptions conditioned on the labels) in the second semantic branch (table 3d). Introducing intermediate supervision in the form of per branch task specific Cross Entropy losses brings even more significant improvement of 1:4% over the baseline (table 3e) underlining the importance of this component. In further tests, all using the branch losses, we see that conditioning the second (description) branch on itself does not bare improvements (table 3f), yet a substantial improvement of 2:1% over the baseline is obtained when adding the self-attending description as the third semantic branch (table 3g). Changing the third semantic branch to use labels for attending to the added description semantics, and thus utilizing the most comprehensive conditioning strategy (attending using all prior inputs to the combination) leads to the maximal 2:2% improvement over the baseline (table 3h) and comprises our final method. Finally, in additional experiments we have observed that adding additional semantic branches, while re-using the same semantic information, does not help the performance (table 3i, as an example). This is intuitive as this likely leads to increased over-fitting due to adding more trainable network parameters.

Embodiments may utilize an extended approach for few-shot learning with additional semantic information. Embodiments may utilize few-shot learning with semantics closer to

TABLE 3

Ablation study performed on 1-shot experiment on the miniImageNet benchmark. With 1 = category label, d = category description, v = visual prototype. x/y (e.g. 1/1) means x is the branch input and the convex combination parameter is conditioned on y. The 'Branch losses' column marks models that utilize the internal supervision of per branch task CE losses. a. Is the AM3 baseline. b. Using only description semantics we observe similar results as when using only labels. c. The effect of 'ensemble', i.e. adding another branch with no extra semantic, is minor (+0.3). d. Adding a second branch with extra semantics adds 0.8% over the baseline. e-f. Utilizing branch losses with extra semantics adds another 0.6%. g-h. Third branch adds another 0.8%. i. Adding a forth branch does not help.

| Description | Branch 1 | Branch 2 | Branch 3 | Branch 4 | Branch losses | Accuracy |
|---|---|---|---|---|---|---|
| a. Only label (AM3) | 1/1 | — | — | — | — | 65.0 |
| b. Switching to description | d/d | — | — | — | — | 65.0 |
| c. Cascade effect (same semantics) | 1/1 | 1/1 | — | — | — | 65.3 |
| d. Multiple semantics (2 branches) | 1/1 | d/v | — | — | — | 65.8 |
| e. Multiple semantics (2 branches) | 1/1 | d/v | — | — | ✓ | 66.4 |
| f. Multiple semantics (2 branches) | 1/1 | d/v | | | ✓ | 66.4 |
| g. Multiple semantics (3 branches) | 1/1 | d/v | d/d | | ✓ | 67.1 |
| h. Multiple semantics (3 branches) | 1/1 | d/v | d/1 | | ✓ | 67.2 |
| i. Multiple semantics (4 branches) | 1/1 | d/v | d/1 | v/1 | ✓ | 67.0 | the setting used by human infants by building on multiple semantic explanations (e.g. name and description) that accompany the few image examples and utilize more complex natural language based semantics rather than just the name of the category. Many other ways for combining multiple semantic information with visual inputs are possible. For example, embodiments may utilize attending to visual and semantic branches combining information from all the task categories. I'n embodiments, the coefficient of each category semantic prototype may be computed from the attention MLP input of the corresponding category (either semantic or visual prototype of the same category). Embodiments may attend based on the entire task jointly. Embodiments may use alternative non-linear (e.g. MLP) combination schemes for visual and semantic prototypes instead of (linear) convex combinations. Embodiments may learn alternative metrics, conditioned on the semantics, for comparing prototypes and query image features (e.g. learned Mahalanobis distance, with covariance matrix computed from semantic prototypes). Embodiments may use semantic ensembles—instead of combining prototypes, combine logits resulting from different semantic and visual branches. Embodiments may use different semantic sources and prototype/attention combinations, for example, using the categories hierarchy or multi-modal sources of semantics, such as audio/smell/touch/taste, to further approximate the human infant learning environment.

Figure 4:
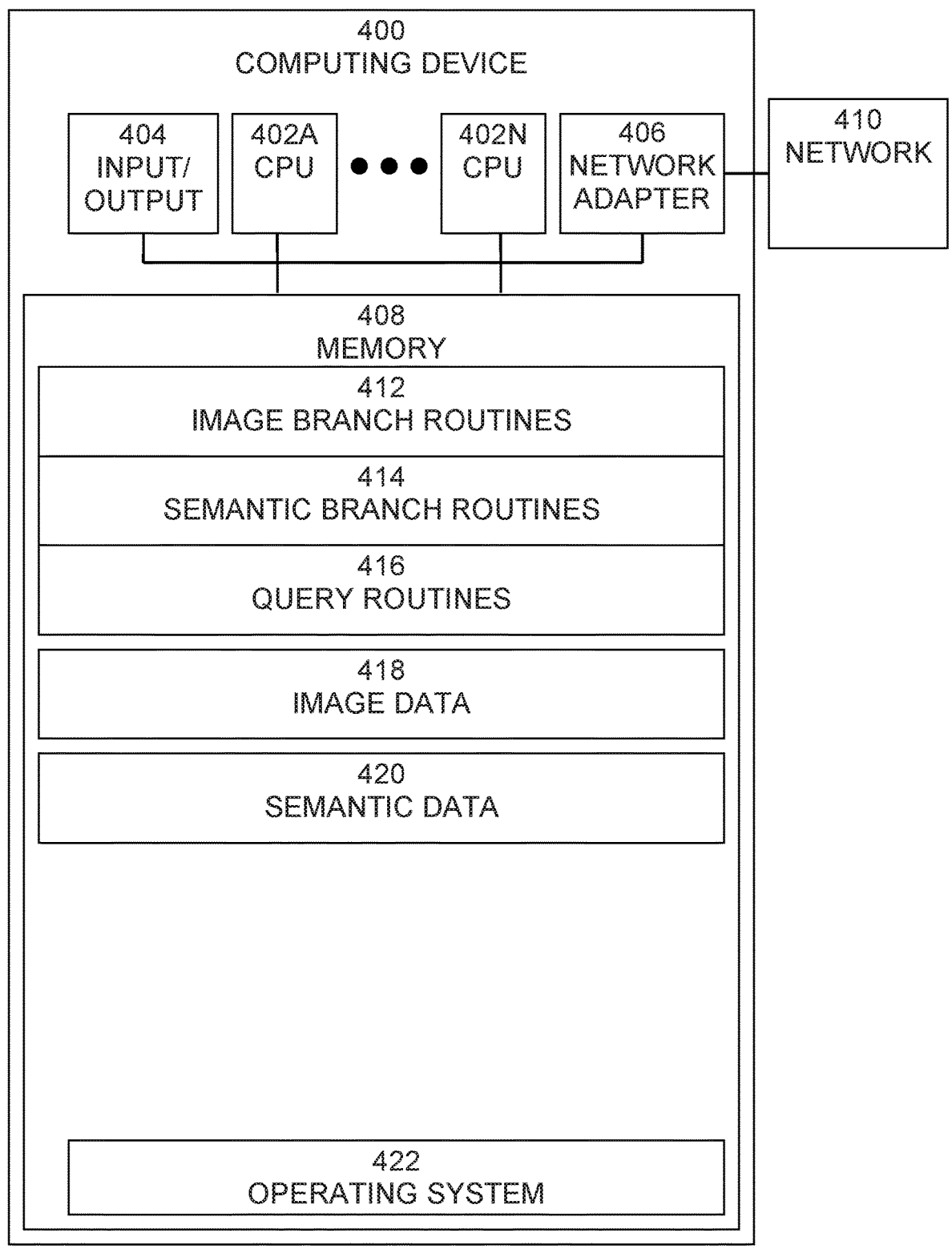
FIG. 4 is an exemplary block diagram of a computer system which processes involved in the embodiments described herein may be implemented.

An exemplary block diagram of a computer system 400, in which processes involved in the embodiments described herein may be implemented, is shown in FIG. 4. Computer system 400 may be implemented using one or more programmed general-purpose computer systems, such as embedded processors, systems on a chip, personal computers, workstations, server systems, and minicomputers or mainframe computers, or in distributed, networked computing environments. Computer system 400 may include one or more processors (CPUs) 402A-402N, input/output 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present communications systems and methods also include embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 4, memory 408 may include image branch routines 412, semantic branch routines 414, query routines 416, image data 418, semantic data 420, and operating system 422. Image branch routines 412 may include software routines and models to provide the capability to compute features both image data 408, such as training images of the few-shot task and for query images, as described above. Semantic branch routines 414 may include software routines and models to provide the capability to process associated semantic information 420 for learning to incorporate the additional semantic information, as described above. Query routines 416 may include software routines to compute query features from query images and to compare the query features to final prototypes, as described above. Image data 418 may include both training images and query images, as described above. Semantic data 420 may include associated semantic information, such as labels, descriptions, etc., as described above. Operating system 422 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium nay be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of computer vision processing, implemented in a computer comprising a processor, memory accessible by the processor, and computer program instructions stored in the memory and executable by the processor, the method comprising:

training a neural network system implemented in the computer system to classify images into a plurality of classes using one or a few training images for each class and a plurality of associated semantic information, wherein the plurality of associated semantic information is from a plurality of sources and comprises at least some of class/object labels, textual description, or attributes, and wherein the neural network is trained by modulating the training images by sequentially applying the plurality of associated semantic information; and classifying query images using the trained neural network system.

2. The method of claim 1, wherein the modulating is unconstrained.

3. The method of claim 2, wherein the neural network system comprises at least one branch for processing images and a plurality of branches for processing semantic information, each branch corresponding to a class, and updating machine learning models based on the image or semantic information processed by that branch.

4. The method of claim 3, wherein each branch generates prototype feature vectors of the class to which each branch corresponds, based on the image or semantic information processed by that branch.

5. The method of claim 4, wherein the prototype feature vectors from each branch are combined using a convex combination to generate predictions based on data input to all branches.

6. The method of claim 5, wherein the convex combination is weighted using a semantic attention coefficient computed based on at least one of the prototype feature vectors.

7. The method of claim 6, wherein the associated semantic information comprises labels, descriptions, and attributes related to the images.

8. A system for computer vision processing, the system comprising a processor, memory accessible by the processor, and computer program instructions stored in the memory and executable by the processor to perform:

training a neural network system implemented in the computer system to classify images into a plurality of classes using one or a few training images for each class and a plurality of associated semantic information, wherein the plurality of associated semantic information is from a plurality of sources and comprises at least some of class/object labels, textual description, or attributes, and wherein the neural network is trained by modulating the training images by sequentially applying the plurality of associated semantic information; and classifying query images using the trained neural network system.

9. The method of claim 8, wherein the modulating is unconstrained.

10. The system of claim 9, wherein the neural network system comprises at least one branch for processing images and a plurality of branches for processing semantic information, each branch corresponding to a class, and updating machine learning models based on the image or semantic information processed by that branch.

11. The system of claim 10, wherein each branch generates prototype feature vectors of the class to which each branch corresponds, based on the image or semantic information processed by that branch.

12. The system of claim 11, wherein the prototype feature vectors from each branch are combined using a convex combination to generate predictions based on data input to all branches.

13. The system of claim 12, wherein the convex combination is weighted using a semantic attention coefficient computed based on at least one of the prototype feature vectors.

14. The system of claim 13, wherein the associated semantic information comprises labels, descriptions, and attributes related to the images.

15. A computer program product for computer vision processing, the computer program product comprising a non-transitory computer readable storage having program instructions embodied therewith, the program instructions executable by a computer, to cause the computer to perform a method comprising:

training a neural network system implemented in the computer system to classify images into a plurality of classes using one or a few training images for each class and a plurality of associated semantic information, wherein the plurality of associated semantic information is from a plurality of sources and comprises at least some of class/object labels, textual description, or attributes, and wherein the neural network is trained by modulating the training images by sequentially applying the plurality of associated semantic information; and classifying query images using the trained neural network system.

16. The method of claim 15, wherein the modulating is unconstrained.

17. The computer program product of claim 16, wherein the neural network system comprises at least one branch for processing images and a plurality of branches for processing semantic information, each branch corresponding to a class, and updating machine learning models based on the image or semantic information processed by that branch.

18. The computer program product of claim 17, wherein each branch generates prototype feature vectors of the class to which each branch corresponds, based on the image or semantic information processed by that branch.

19. The computer program product of claim 18, wherein the prototype feature vectors from each branch are combined using a convex combination to generate predictions based on data input to all branches.

20. The computer program product of claim 19, wherein the convex combination is weighted using a semantic attention coefficient computed based on at least one of the prototype feature vectors, and wherein the associated semantic information comprises labels, descriptions, and attributes related to the images.

\* \* \* \* \*